(12) United States Patent
Kang et al.

(10) Patent No.: US 6,880,980 B2
(45) Date of Patent: Apr. 19, 2005

(54) OPTICAL FIBER FERRULE

(75) Inventors: Keith Kang, Hollis, NH (US); John Trezza, Nashua, NH (US)

(73) Assignee: Xanoptix, Inc., Merrimack, NH (US)

( * ) Notice: Subject to any disclaimer, the term of this patent is extended or adjusted under 35 U.S.C. 154(b) by 0 days.

(21) Appl. No.: 10/623,435

(22) Filed: Jul. 18, 2003

(65) Prior Publication Data

US 2004/0057671 A1 Mar. 25, 2004

Related U.S. Application Data

(63) Continuation of application No. 10/090,880, filed on Mar. 4, 2002, now Pat. No. 6,604,866.

(51) Int. Cl.[7] .................................................. G02B 6/36
(52) U.S. Cl. ........................................................ 385/78
(58) Field of Search .......................... 385/49–68, 78–85, 385/72, 89, 88

(56) References Cited

U.S. PATENT DOCUMENTS 5,815,621 A 9/1998 Sakai et al. .................... 385/80

6,158,900 A 12/2000 Omiya et al. ................. 385/78

FOREIGN PATENT DOCUMENTS

JP 2002 162536 * 11/2000

* cited by examiner

Primary Examiner—Javaid H. Nasri
(74) Attorney, Agent, or Firm—Morgan & Finnegan LLP

(57) ABSTRACT

A ferrule has a body, peripherally dimensioned for receipt within a commercially available fiber optic connector, the body has a forward portion comprising a front side and a rear side, the front side defining a face of the ferrule, the rear side defining an inner surface. The forward portion has a large format array of fiber holes, each of the fiber holes in the array extending between the front side and the rear side and being sized to accept an optical fiber inserted therein, and the forward portion having a thickness, T, less than 3000 microns but at least a minimum thickness sufficient to support optical fibers inserted into the fiber holes. An optical connector, having a ferrule, and a fiber optic cable assembly are also described.

20 Claims, 19 Drawing Sheets

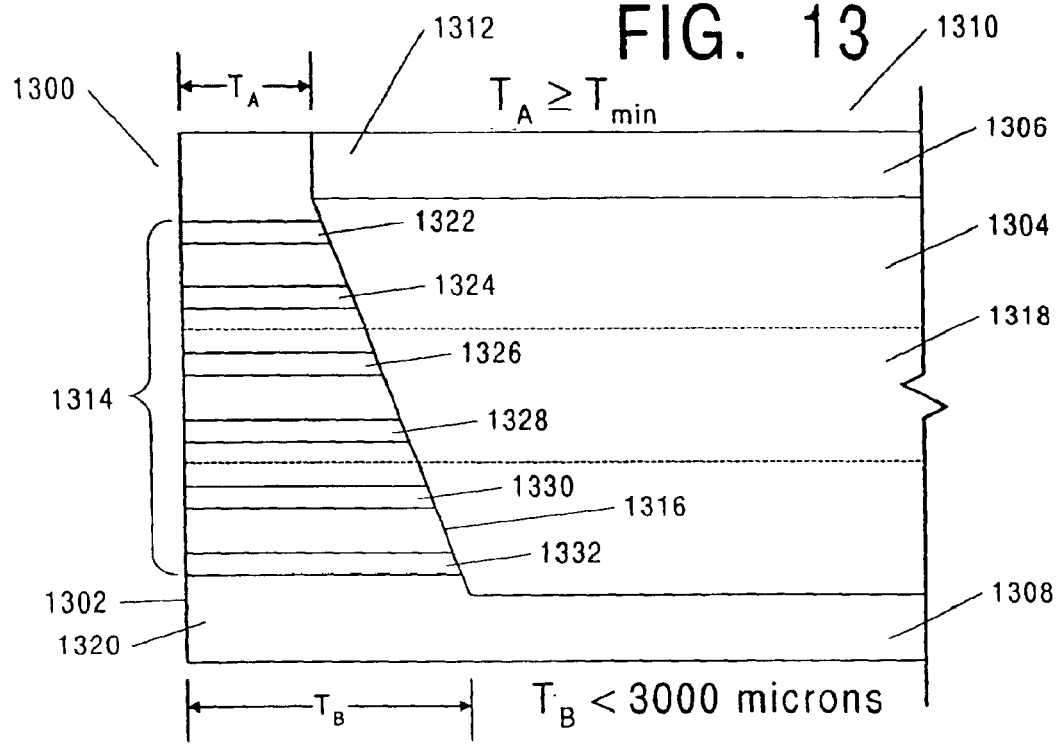
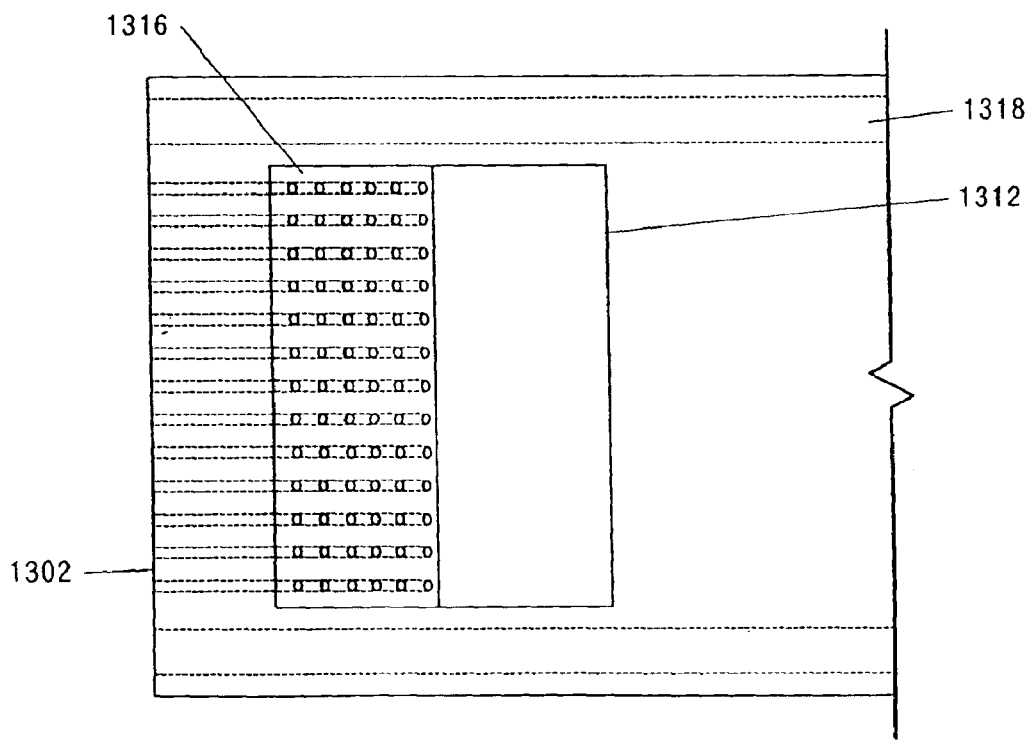
FIG. 14 (not to scale)

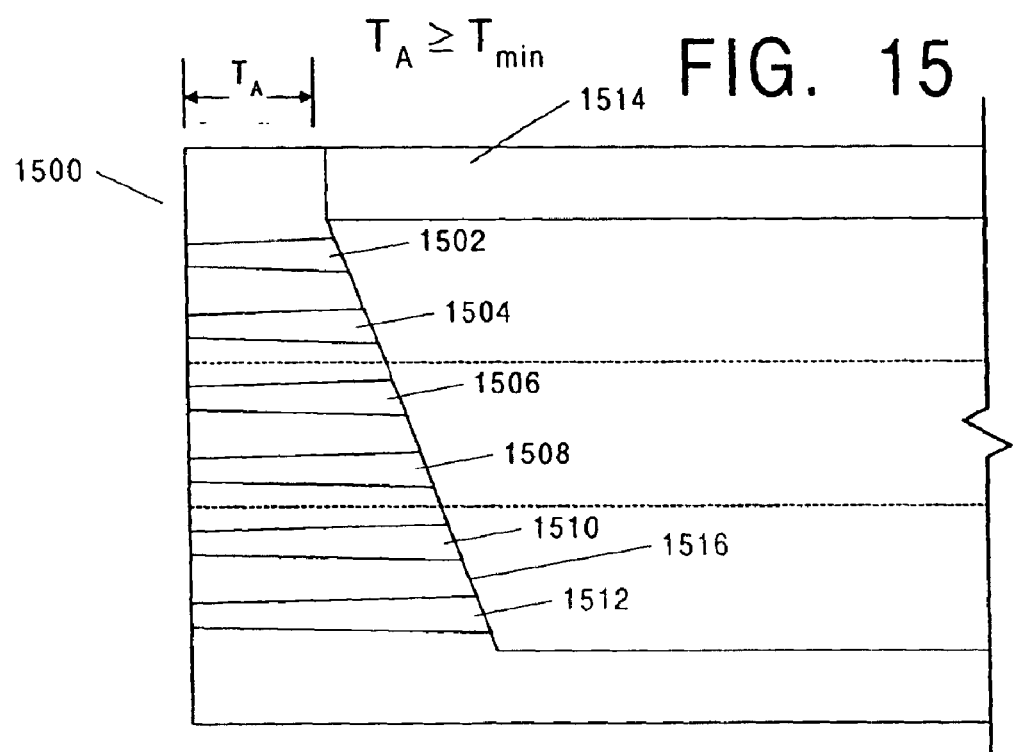
FIG. 15
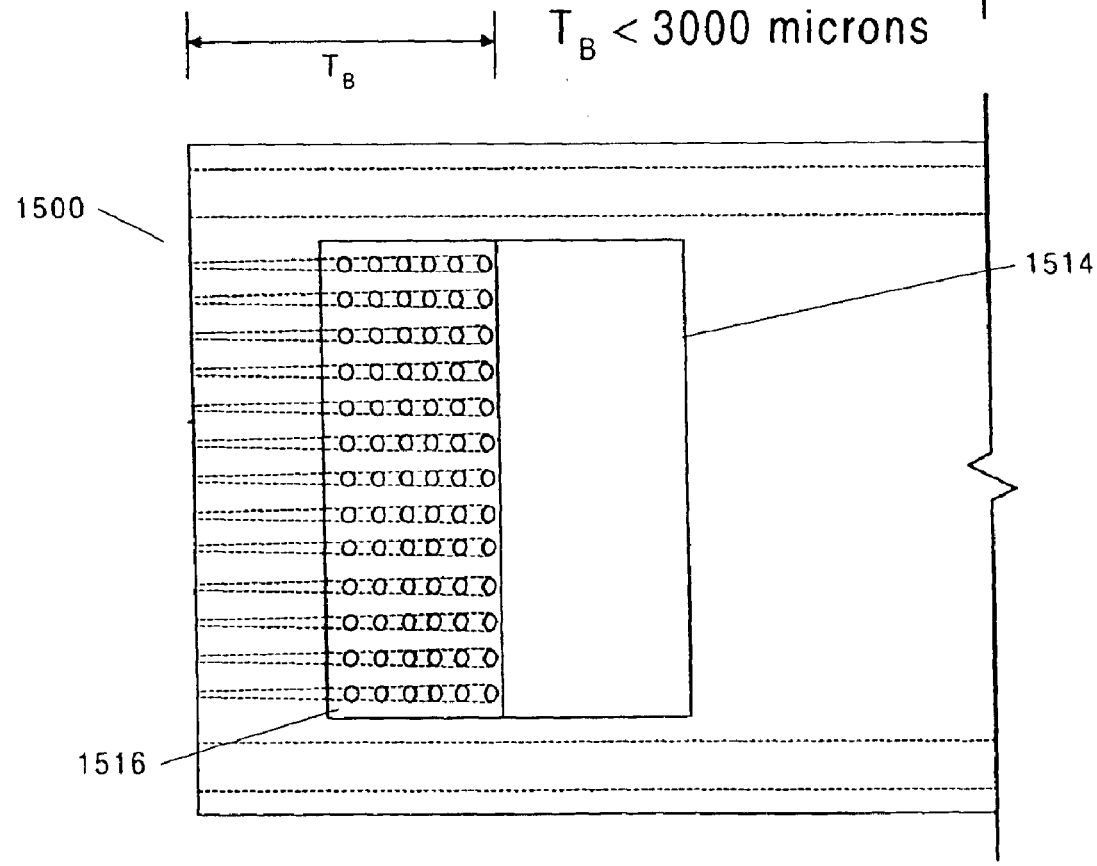
FIG. 16 (not to scale)

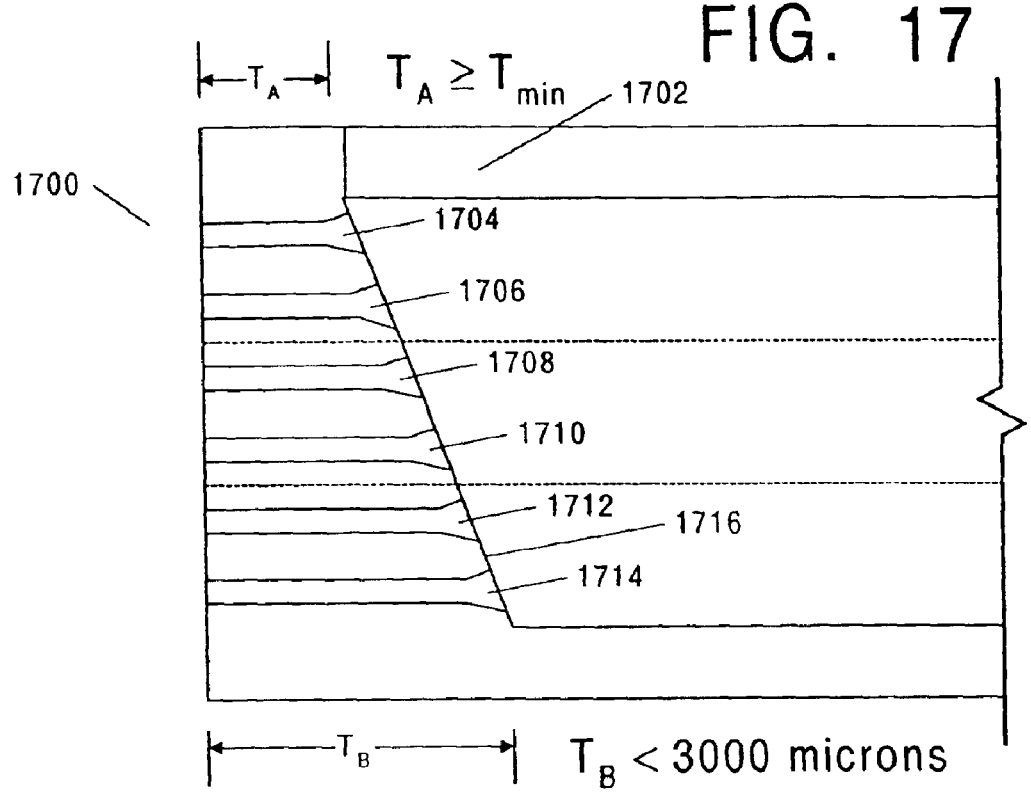
FIG. 17
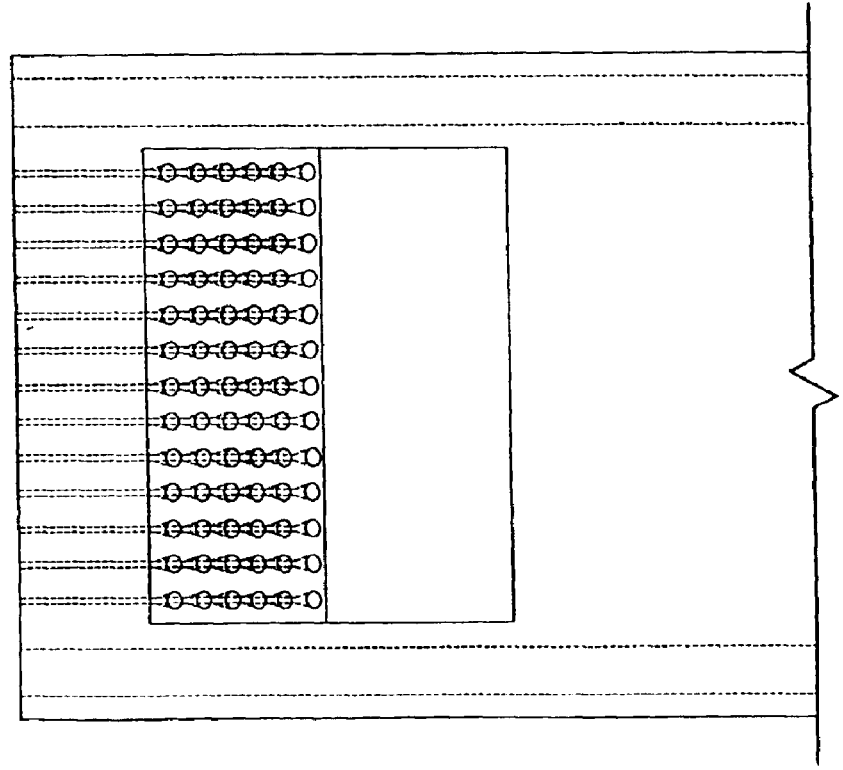
FIG. 18 (not to scale)

FIG. 21
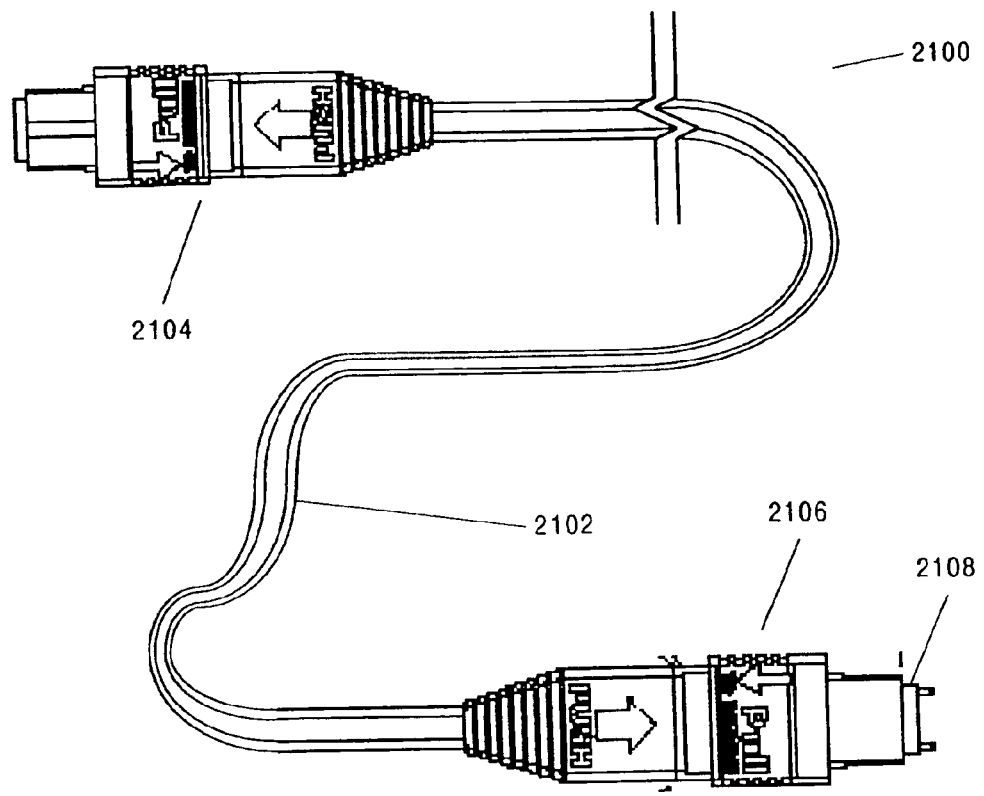
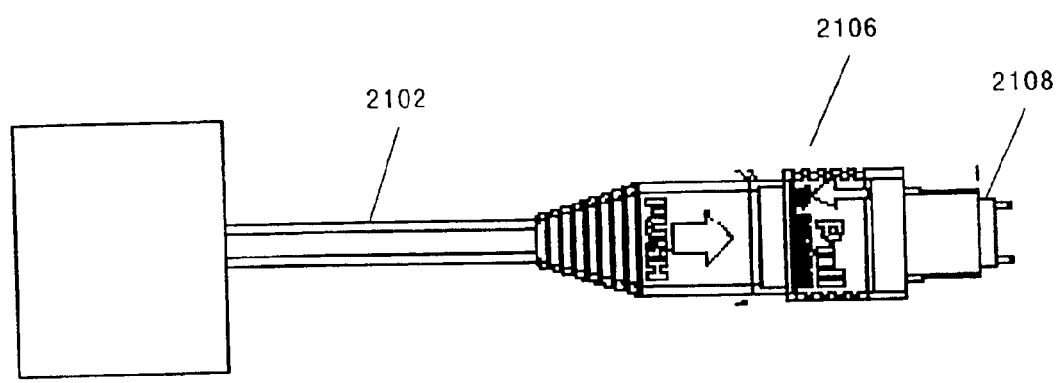
FIG. 22

OPTICAL FIBER FERRULE

This is a continuation of application Ser. No. 10/090,880, filed Mar. 4, 2002 now U.S. Pat. No. 6,604,866 which is incorporated herein by reference in its entirety.

FIELD OF THE INVENTION

This invention relates to optical connectors and, more particularly, to ferrules used within the optical connectors to hold optical fibers.

BACKGROUND

Commercial optical fiber connector assemblies 100, such as shown in exploded view in FIG. 1, are used to couple optical fibers together so that light transiting from a bundle 102 of one or more fibers in one end 104 of the connector assembly 100 will pass through the connector assembly 100 to fibers or a device connected to the other end 106 of the connector assembly 100. A ferrule 108 is typically part of the connector 100 and is the part of the connector 100 into which the fibers 110 themselves are inserted before the ferrule 108 is inserted into the overall connector assembly 100 itself. The ferrule 108 holds the fiber(s) 110 in a precise position and ensures that when the connector assembly is attached to a mating connector assembly or some other device, the fibers of the connector assembly are held in consistent alignment.

In the multi-fiber connectors available today, such as shown in U.S. Pat. No. 5,214,730, most of the connections are for fiber arrays of between 2 and 12 fibers arranged in a single row (although some commercial 2×12 configurations are available). Those connectors are referred to by various names, depending upon who makes them. In 1×2 arrays, connectors are referred to as ST, LC, MT-RJ connectors while the 1×12 and some 2×12 array connectors are referred to as MTP®, MPO, MPX and SMC connectors, among others. In the 1×12 or 2×12 area, all of the various connectors use a common type of ferrule commercially available from, among others, US Conec Ltd. and Alcoa Fujikura Ltd. Moreover, in some cases, the ferrules used in the small array connectors (i.e. for less than 12 fibers) are form and fit compatible for use with the MTP, MPO, MPX and SMC connectors. In addition, other types of commercial connectors for small arrays of fibers (i.e. less than 12) are available or have been proposed, for example, as shown in U.S. Pat. No. 5,743,785.

FIG. 2 is an enlarged photograph, in perspective view, of a prior art 1×12 ferrule 200 having an outer dimensional shape for use in an MTP, MPO, MPX or SMC connector of the prior art. Such ferrules 200 are made by molding plastic or epoxy. For example, the 1×12 (shown) and similar 2×12 ferrule technology currently in commercial use is based upon molding and curing of a glass filled epoxy resin (a high-performance plastic) using a common molding technique called transfer molding.

There has been an increasing need among users in the fiber optic field for larger groups of fibers, so demand for single connectors to handle arrays of fibers in excess of 12 has been increasing as well. Today, ferrules 200 such as shown in FIG. 2 that are molded out of epoxies or plastics can be made to the necessary tolerances for small arrays of multimode fibers, on the order of one or two rows of up to 12 fibers each, but special care must be taken during fabrication. Plastic molding technology is very process sensitive and molds having the requisite precision for even small arrays are extremely difficult to make. Even so, yields tend to be poor due to the inherent manufacturing process errors that occur in plastics molding. Since the tolerances on these pieces must be very accurate (on the order of about 1 to 2 microns), high yield manufacture is difficult when the array size necessitates two rows and exceptionally difficult for more than two rows.

The overall ferrule volume is very small, since ferrules 200 for the above MTP, MPO, MPX or SMC connectors are about 2 mm (2000 microns) high, 6 mm wide and 8 mm deep, and have a face portion of at least 3 mm thick to support and hold optical fibers, so molding or machining of features into the face surface 202 of the ferrules through the face portion, in the number and size required to hold multiple optical fibers (which typically have about a 125 micron cladding diameter for both multimode fiber and single mode fiber and are spaced from each other on a center-to-center spacing ("pitch") of 250 microns), is very difficult.

Additionally, making ferrules for larger arrays is made even more difficult because, as the holes approach the periphery of the ferrule, the structural integrity of the peripheral walls near the holes decreases. In addition, process variations during production cause parts to also have poor tolerance at the periphery. As a result, they become overly fragile, causing hole and in some cases component collapse and/or they have distortions or excess material that impedes or prevents fiber insertion and are too fragile to successfully attempt removal of any such material. The problem is that in molding plastic ferrules for holding higher multimode fiber counts in the same small area results in even less structural integrity for the molded piece.

Nevertheless, in an attempt to address the increasing industry need, companies have attempted to manufacture connectors for larger arrays using the techniques currently used to manufacture small array ferrules (i.e. ones with a single row of between two and 12 fiber holes) with little to no success. For example, one company is known to have made a 5×12 array ferrule and 5×16 array ferrule. One example of the 5×12 ferrule is shown in the photograph of FIG. 3 and both are described in Ohta et al., Two Dimensional Array Optical Fiber Connector, Fujikura Technical Review (2000). However, although not discussed in the article, applicants were informed that, in making those ferrules according to the prior art molding technique, they achieved such poor yields that the commercial cost of producing the pieces was deemed prohibitive—in that the problems encountered and extremely low yield would result in their being sold for some $500 each, if they could be sold at all. Moreover, the process was such that the molds for producing the pieces were destroyed in the process. As a result, they deemed arrays of that size (i.e. arrays of 5 rows) unmanufacturable using the molding processes then available. Other companies, when asked if they could provide similar large array ferrules, would not even attempt to do so, considering them unmanufacturable without even trying.

As described in the Ohta et al. paper, the ferrule also includes a row of guide grooves for each row of holes. In the ferrule of FIG. 3, the access way has been enlarged and the upper rows of guide grooves have been removed so that the holes for the fibers can be viewed through the access way of the ferrule.

FIGS. 4, 6 and 7 are further photographs of the 5×12 ferrule of FIG. 3 taken from different views.

FIG. 4 is a close-up photograph of the exposed row of guide grooves taken looking into the ferrule through an access way from the same angle as in FIG. 3. The purpose of the guide grooves is to facilitate fiber insertion and to support the fibers once inserted by effectively increasing the thickness of the face portion by up to an additional 1.5 mm or more.

FIG. 5 shows a simplified view of a portion 500 of a ferrule having a 3×4 array of fiber holes 502 and guide grooves 504, similar to those used in the ferrule of FIG. 3. The rows are stepped, with the lowest row 506 being the longest, and each successively higher row 508, 510 being slightly shorter. Depending upon the particular ferrule the guide grooves are semi-cylindrical or "V" shaped in cross section. During manufacture, fibers are inserted into the guide grooves of the lowest row, followed by the next higher row, etc. until all the desired fibers have been inserted. As their name implies, the guide grooves guide or direct the fiber into the fiber holes of the ferrule.

FIG. 6 is a closer photograph of the ferrule holes in the ferrule of FIG. 3 taken looking into the ferrule at an angle through the access way. As noted above, some of the rows of guide grooves have been removed so that several rows of holes are exposed for viewing. As can be seen in the photographs of FIG. 4 and, more clearly in the photograph of FIG. 6, there is visible variation in the size and shape of the holes as well as the walls separating one hole from another. These variations are due to the problems noted above. Depending upon the particular defect, the hole variation can inhibit fiber insertion, affect the pitch, or affect the inserted fiber angle (relative to other inserted fibers)—all undesirable results. In addition, although these holes are clearly visible in FIG. 6, in actuality, the fiber holes would be obscured from view by the guide grooves. In addition, the presence of the guide grooves makes it difficult, if not impossible, to fix a partially blocked or collapsed hole without damaging the ferrule.

FIG. 7 is a photograph of the same holes taken looking into the ferrule of FIG. 3 through the rear end of the ferrule. As can clearly be seen in this photograph, there is visible variation in the size and shape of the holes as well as the walls separating one hole from another including marked differences in hole size, partially blocked or collapsed holes and variation in wall thickness between adjacent holes.

As such, the prior art has been forced to do without commercial connectors for such large arrays, because such arrays can not be reliably created, and ferrules for use in commercial connectors for still larger format arrays are still considered unmanufacturable or prohibitively difficult for those in the art to even attempt. Moreover, since single mode fibers have an even smaller core diameter than multimode fibers and hence can have a smaller overall diameter, molding or machining ferrules for use in present form factor commercial connectors that will accommodate large arrays of single mode fibers is currently, for all practical purposes, considered equally prohibitive if not impossible—particularly on a cost effective commercially viable scale.

Thus, our attempts to find an entity that could mold a commercially available connector compatible plastic ferrule to accommodate an array of 5 rows×12 fibers/row or any large format array (in terms of number of rows over two, irrespective of fibers per row) left us discouraged and, like those in the art seeking similar pieces, to the conclusion that such ferrules could either not be made on a commercially viable scale or could not be made at all.

Thus, despite the strong and growing need for ferrules that can be used for large arrays of fibers, and the attempts in the art to fulfill those needs, the art has not been able to successfully do so. Moreover, to the limited extent anyone has even been able to mold the above 5×12 or 5×16 plastic ferrules at all, the ability to consistently and reliably produce such ferrules to address the need in the art at all, let alone in commodity item quantities, is elusive.

SUMMARY OF THE INVENTION

We have discovered that, contrary to conventional wisdom and the teachings of the prior art, by fabricating a ferrule where the overall thickness of the forward portion of a ferrule (including any structures that facilitate fiber insertion) is less than the 3 mm (i.e. 3,000 microns) or more used in the prior art, a large format array ferrule can be formed using conventional molding techniques. Moreover, it can be done with commercially suitable, cost competitive, yields.

In addition, we have discovered that, by reducing the thickness of the forward portion to less than the 3 mm used in the prior art, such large format array ferrules can also be formed not only using transfer molding techniques, but also injection molding, casting, or powder metallurgy-type "pressing" techniques, as appropriate, for polymers (including thermoplastics, polyimides, curable resins, thermoset resins, etc.), ceramics and metals.

We have further discovered that, contrary to conventional wisdom and the teachings of the prior art, as a separate and significant matter, the guide grooves conventionally thought to be necessary for fiber guiding and/or support, can be dispensed with almost entirely, if not entirely, without unacceptably affecting ease of fiber insertion or fiber support so long as the overall thickness of the forward portion plus the guide grooves (as measured along the axis of a fiber hole) is less than 3000 microns.

The reduced thickness of the forward portion of a ferrule made according to the present invention, particularly when done in conjunction with the elimination, or virtual elimination, of the guide grooves, allows a commercial connector compatible large format array ferrule to be molded repeatably, in commercially suitable quantities, in a cost competitive manner using prior art techniques. Such inventive ferrules have better uniformity in size and shape of the holes and walls between them, in large formats, than could previously be made according to the prior art, without reducing the structural integrity of the ferrule near the face to a point of concern.

A ferrule in accordance with the present invention therefore represents a significant and valuable improvement in the art and addresses a significant need in the art.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIG. 13 is a partial cutaway cross section of another example ferrule;

FIG. 14 is a partial top view of the ferrule portion of FIG. 13;

FIG. 15 is a partial cutaway cross section of another example ferrule variant similar to the one in FIG. 13.

FIG. 16 is a partial top view of the ferrule portion of FIG. 15;

FIG. 17 is a partial cutaway cross section of another example ferrule variant similar to the one in FIG. 13;

FIG. 18 is a partial top view of the ferrule portion of FIG. 17;

FIG. 21 is a fiber optic cable assembly incorporating a ferrule according to the teachings of the invention;

FIG. 22 is an alternative variant of the cable assembly of FIG. 21;

DETAILED DESCRIPTION

Figure 8:
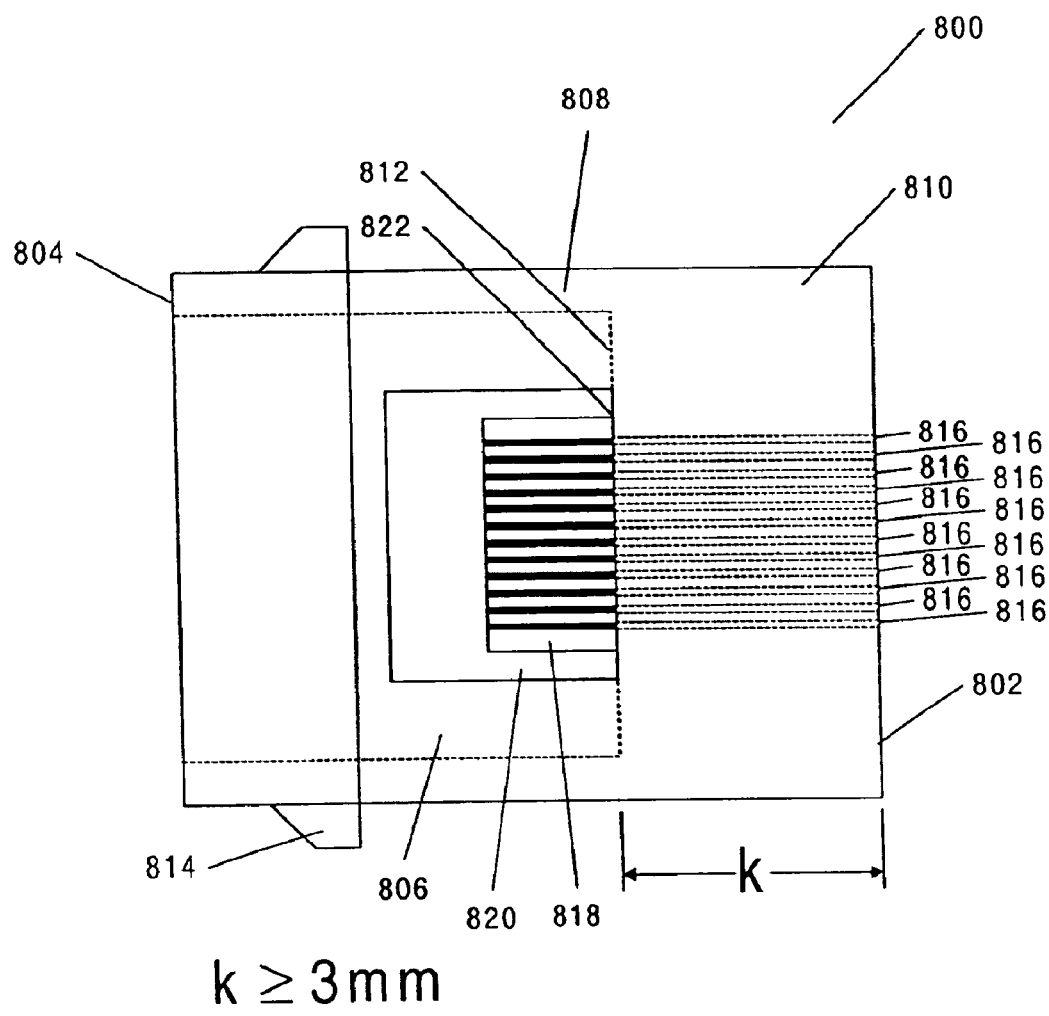
FIG. 8 is a simplified, generalized top view of a plastic ferrule of the prior art.
Figure 9:
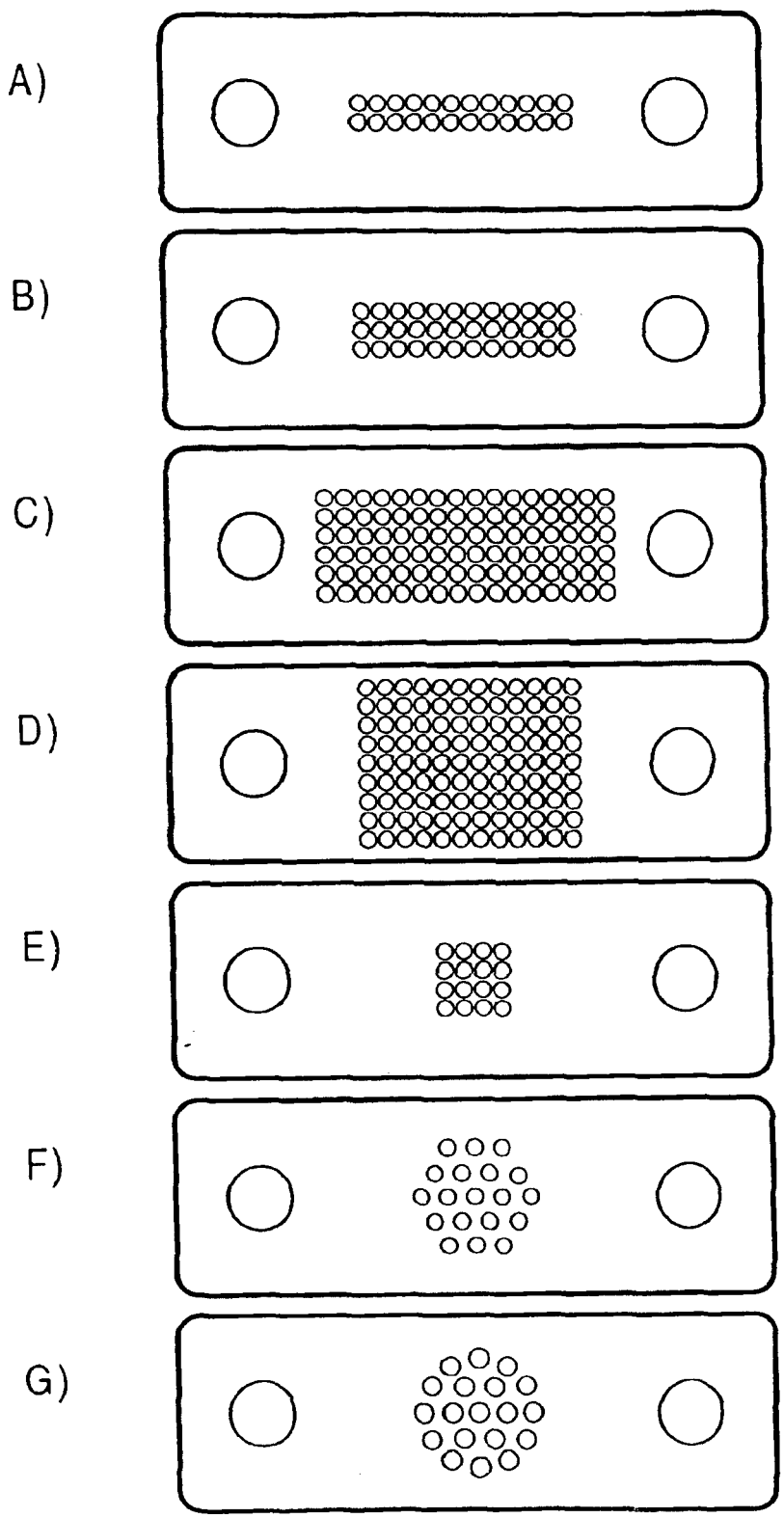
FIGS. 9A though 9G are example arrangements of ferrules configured for large arrays of fibers.

FIG. 8 is a simplified, generalized top view of a plastic ferrule of the prior art. In general, the ferrule 800 has an outer or face surface 802, a rear surface 804, and a chamber 806 defined by the body 808 of the ferrule 800. A forward portion 810 of the ferrule 800 is defined by the separation between the face surface 802 and the innermost part 812 of the chamber 806, referred to for simplicity as the "inner surface". The ferrule 800 also has a shoulder 814 near the rear surface 804 that is used to align and/or act as a stop for positioning the ferrule 800 within a connector.

In the ferrules 800 of the prior art, the thickness "k" of the forward portion 810 is, in accordance with the dictates of conventional wisdom, at least 3 mm (3,000 microns). Holes, called fiber holes 816, each sized to accept a single optical fiber, connect the inner surface 812 with the face surface 802. The individual holes are spaced from adjacent holes by a center-to-center distance, called the "pitch". Most arrays are linear or rectangular and have a pitch of 250 microns (±a few microns of manufacturing tolerance).

Figure 1:
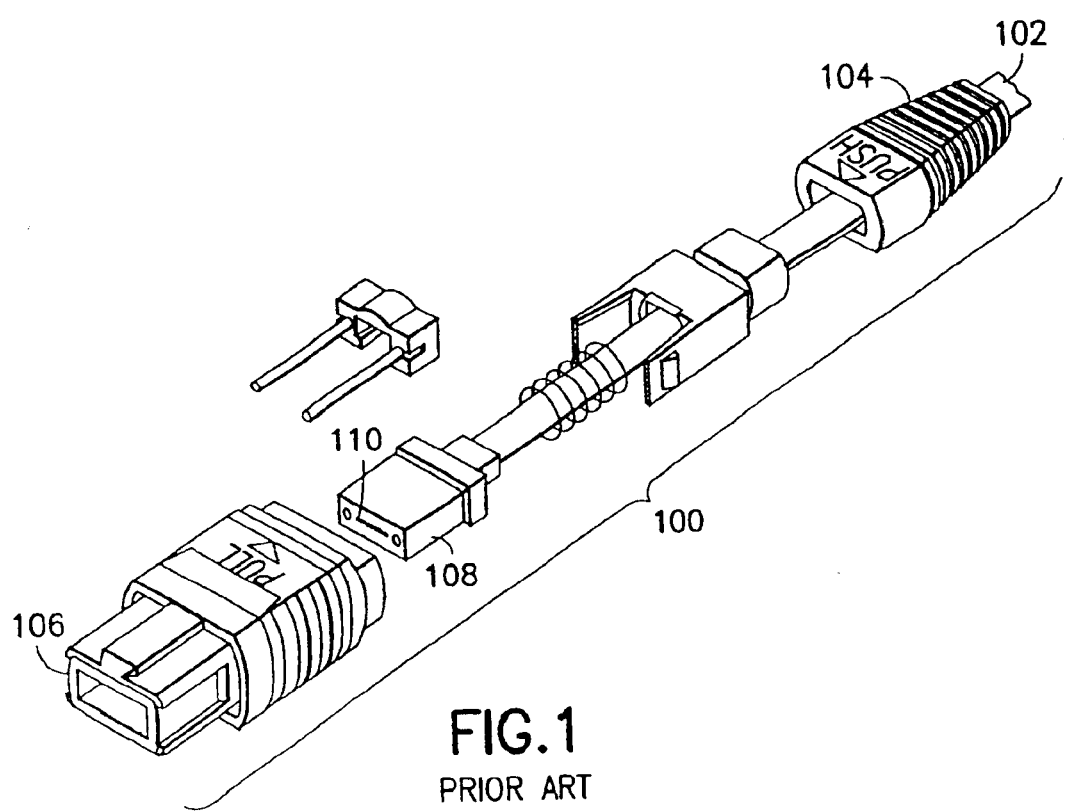
FIG. 1 is a prior art commercial optical fiber connector assembly.
Figure 2:
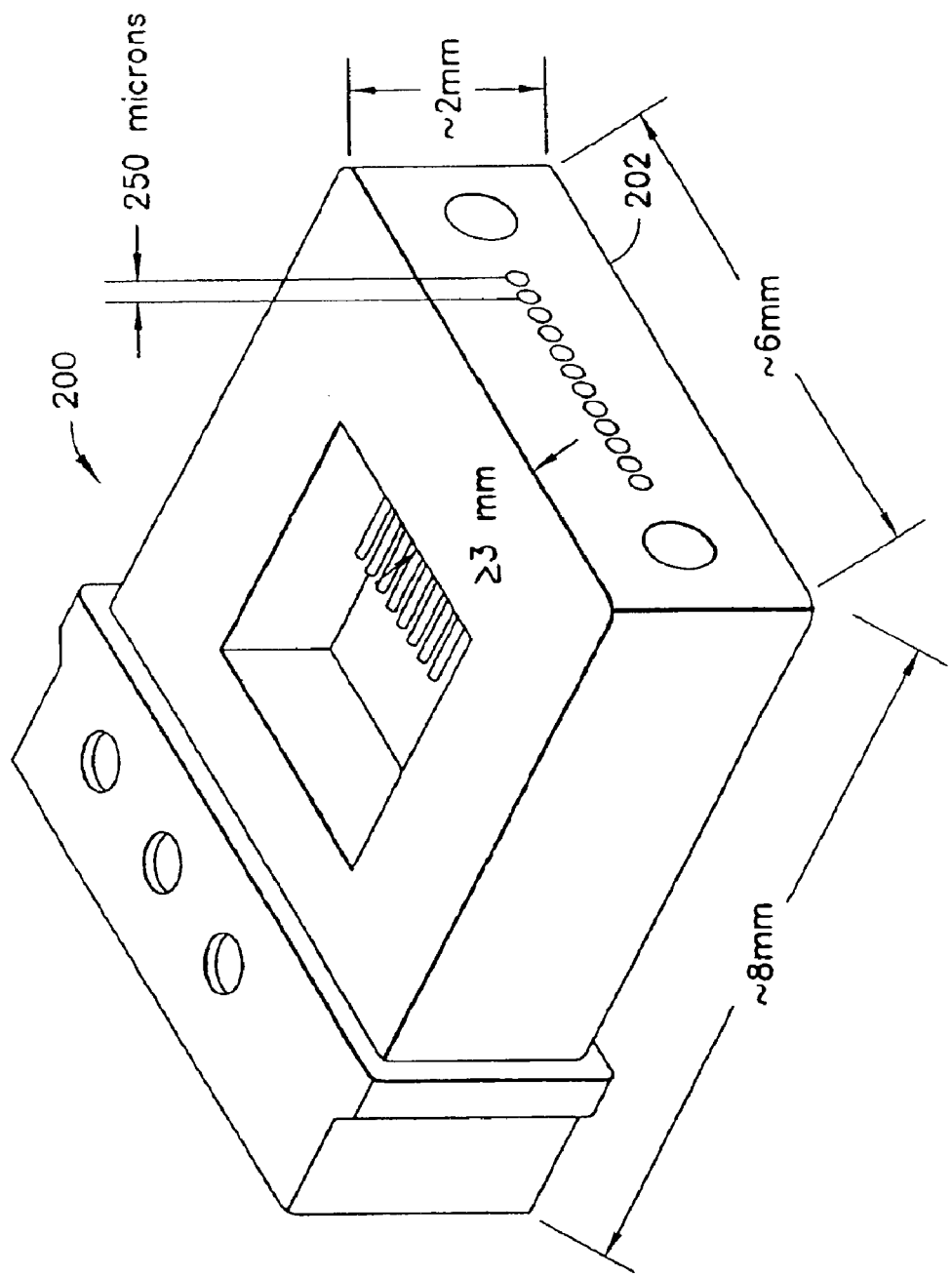
FIG. 2 is an enlarged photograph, in perspective view, of a prior art 1×12 ferrule having an outer dimensional shape for use in an MTP, MPO, MPX or SMC connector of the prior art.
Figure 3:
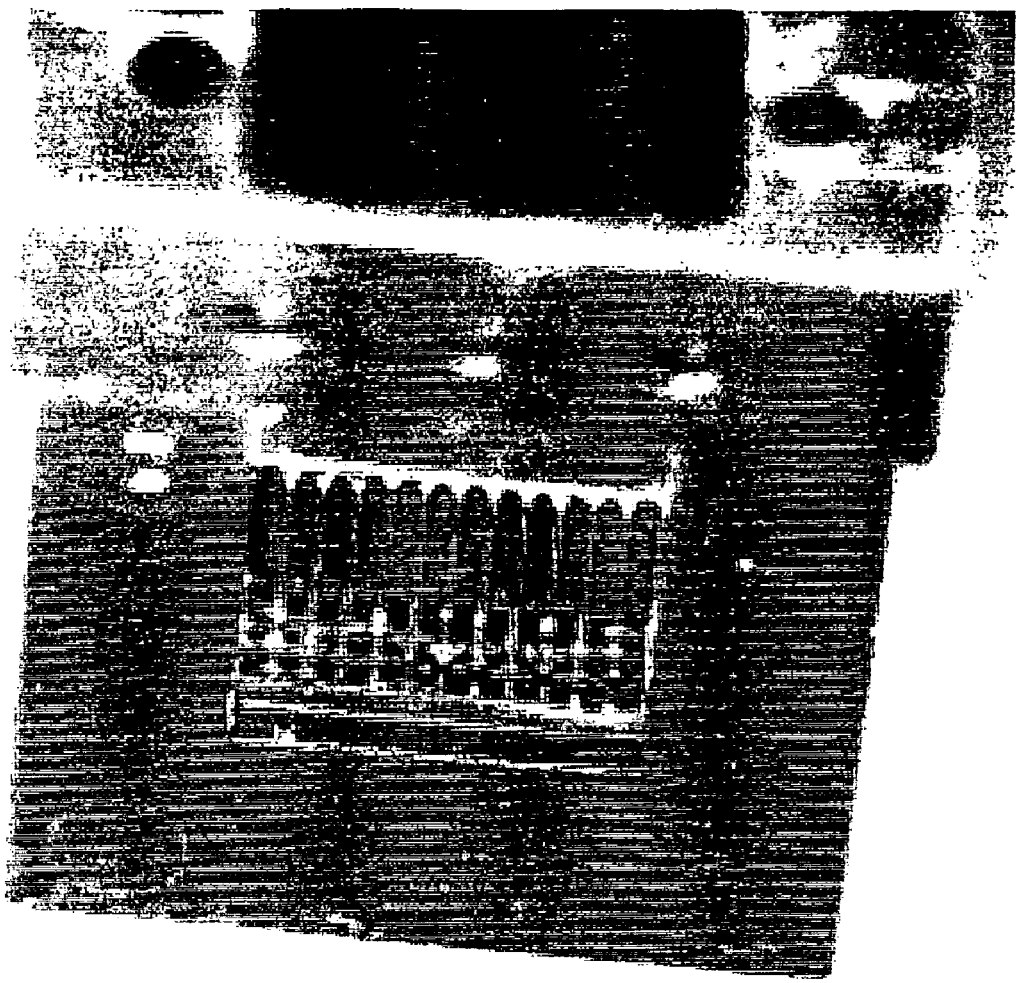
FIG. 3 is a photograph of a 5×12 ferrule of the prior art.
Figure 4:
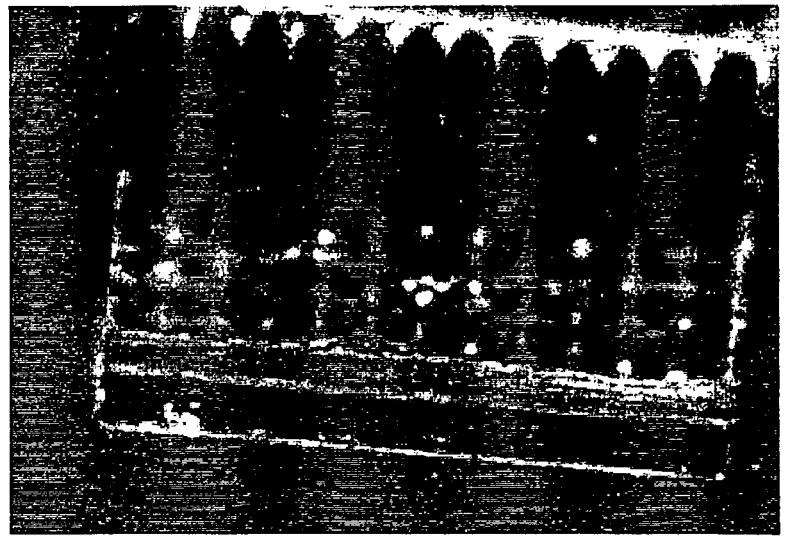
FIG. 4 is a close-up photograph of the exposed row of guide grooves taken looking into the ferrule of FIG. 3.
Figure 5:
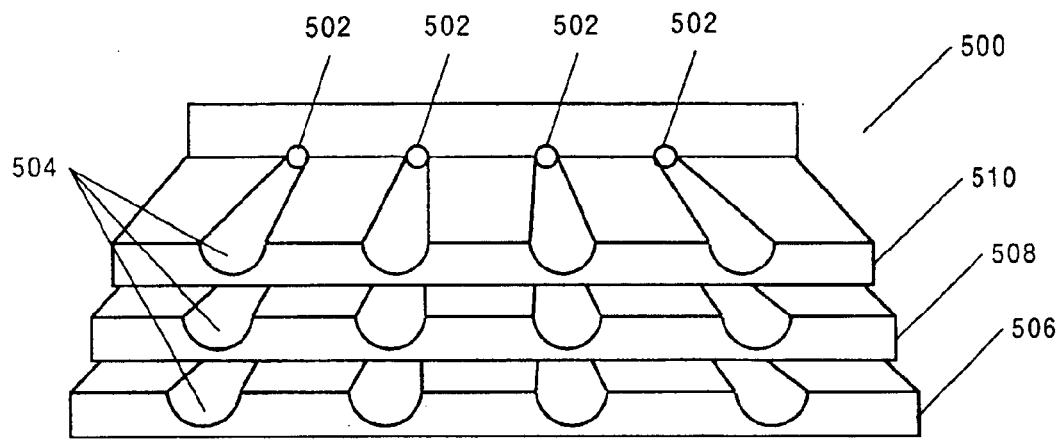
FIG. 5 is a simplified view of a portion of a ferrule having a 3×4 array of fiber holes and guide grooves.
Figure 6:
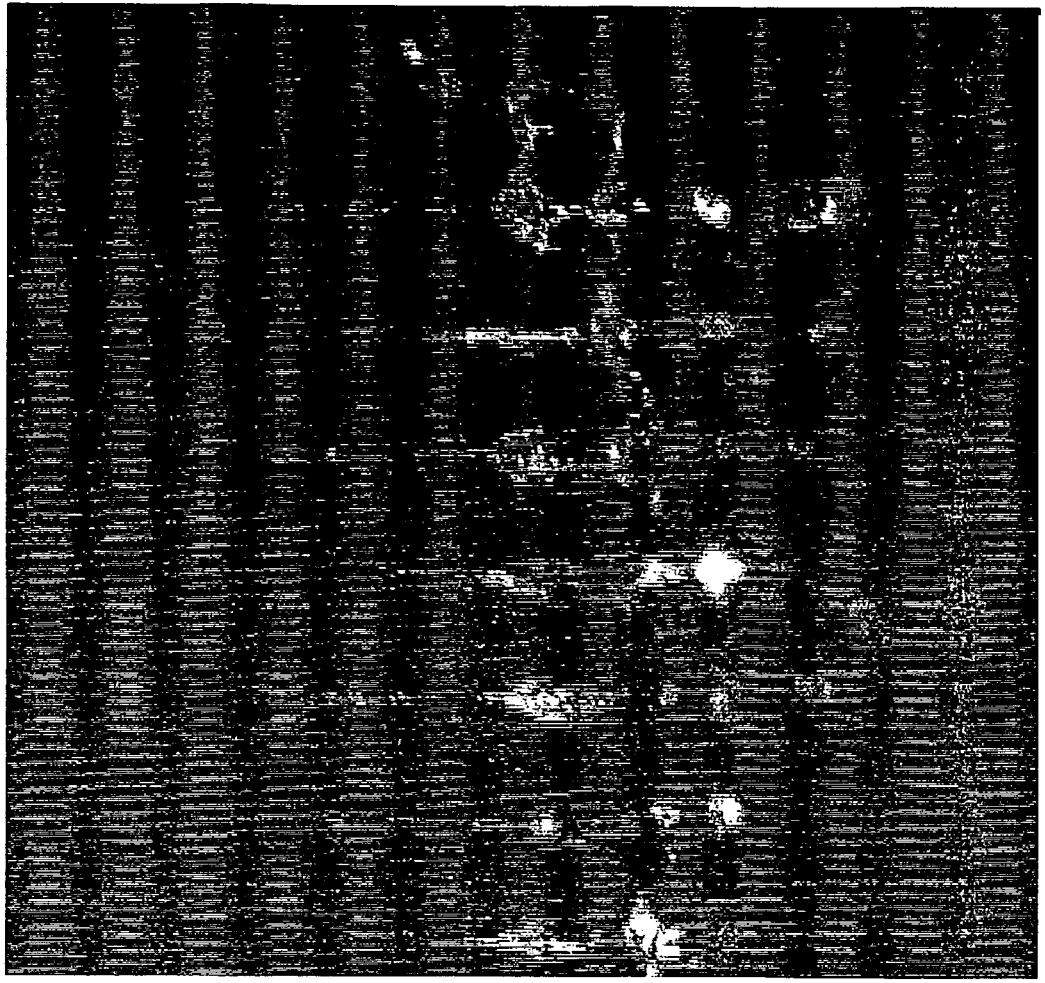
FIG. 6 is a closer photograph of the ferrule holes in the ferrule of FIG. 3.
Figure 7:
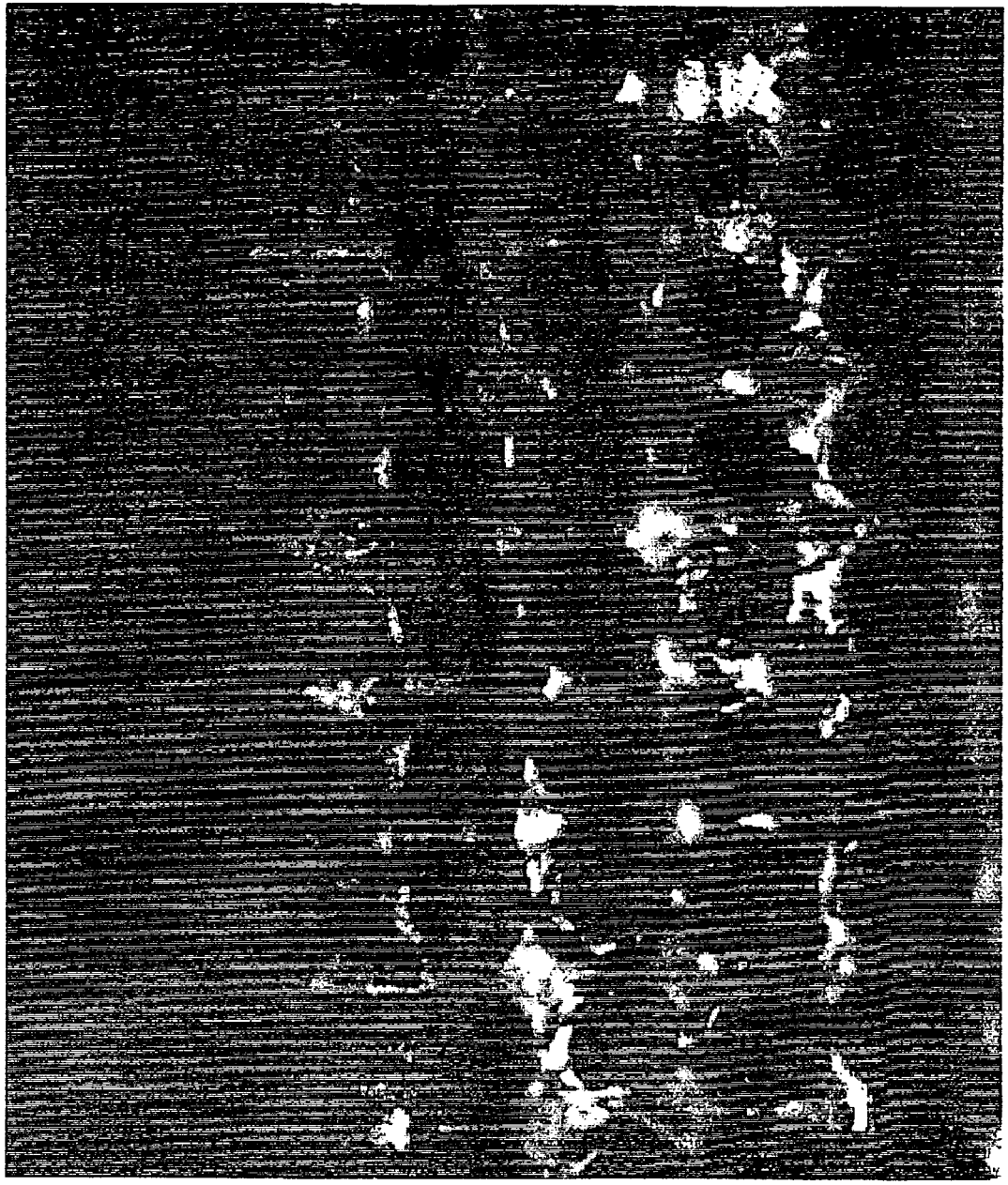
FIG. 7 is a photograph of the holes of FIG. 6 taken looking into the ferrule of FIG. 3 through the rear end of the ferrule.

Additionally, guide grooves 818, one for each hole 816 in each row of holes, are located on the chamber side of the forward portion 810 to, as noted above, facilitate fiber insertion and effectively extend the forward portion to provide further fiber support. These guide grooves 818 are typically about 1.5 mm long, although they can be longer or shorter. In the case of the ferrules described in Ohta et al., the guide grooves are stepped as in FIG. 5 so that each row of guide grooves is slightly longer than the row of guide grooves immediately above it.

In some cases, the ferrule may also contain one or more additional (non-fiber) openings or holes, such as guide pin holes, that are used for other purposes. Such non-fiber holes, whether or not present, are irrelevant to the invention and therefore not discussed herein.

To assemble the ferrule 800, the individual fibers of a group, typically a ribbon or cable, are inserted into the chamber 806 through the rear surface 804 where they are separated and each directed towards the individual holes 816 in the inner surface 812 by the guide grooves 818. The fibers are inserted through the holes 816 up to or through the face surface 802.

An access window 820 provides an opening into the chamber and both facilitates the placing of the fibers into the guide grooves 818 during manufacture and, where appropriate, allows a material, such as an epoxy, to be inserted into the chamber 806, after the fibers are all in place, thereby affixing them within the ferrule 800. Once the fibers are firmly in place, further manufacturing processes such as angle polishing the face surface 802 can be performed.

Depending upon the particular ferrule, the forward edge 822 of the access window 820 may coincide with the inner surface 812 or the forward edge 822 may stop short of the inner surface 812 such as shown in FIG. 8. In either case, according to the conventional wisdom, the reason for the thickness "k" of the forward portion 810 being about 3 mm or more is to ensure there is adequate support of the ends of fibers inserted through the holes 816 as well as adequate structural integrity of the ferrule 800 itself near the face surface 802. This is particularly the case where, due to the connector the ferrule will be used in, the area of the ferrule face 802 can not increase (i.e. it will remain constant) as the number of holes therein increases.

Conventional wisdom teaches that the thickness of the forward portion of the ferrule be made thicker to increase the strength of the ferrule and support the fibers inserted into the holes therein and that guide grooves are necessary to both provide support for, and aid in proper placement of, the fibers in the fiber holes. Conventional wisdom specifically teaches that the thickness of the forward portion of a ferrule be at least 3 mm or thicker, for the structural strength of the ferrule and to adequately support the fibers inserted into the holes therein. As we discovered, this conventional thinking sacrificed the ability to mold ferrules for large arrays.

We have discovered that, contrary to conventional wisdom and the teachings of the prior art, the forward portion of a ferrule of the present invention should be less than the 3 mm or more presently used in the prior art. Moreover, we have discovered that, contrary to conventional wisdom and the teachings of the prior art, the guide grooves can be dispensed with almost entirely, if not entirely, particularly for arrays of 3 rows or more. The effectiveness of this approach was not obvious prior to actually making a ferrule having a forward portion of less than 3 mm and testing it for the ability to properly support and constrain a large array of fibers while maintaining the necessary structural ferrule strength.

In contrast to conventional wisdom, the forward portion of ferrules of the present invention will be thinner than found in a normal ferrule, as opposed to being made about 3 mm or thicker as in conventional ferrules. In addition, and in contrast to conventional wisdom, the ferrule of the present invention has minimal to no guides, as opposed to long or stepped length guide grooves for each row of holes.

As a result, the configuration of the inventive ferrules makes molding large array ferrules possible using prior art techniques and makes possible the doing so with a commercial production level yield at a cost fairly close to that of the prior art ferrules resulting in a significant cost savings relative to those of the prior art. The reduced thickness of the forward portion of the ferrule allows polymer ferrules for large arrays to be made using prior art techniques with better uniformity in the size and shape of the holes as well as the walls between them, without reducing the structural integrity of the ferrule to a point of concern. The inventive ferrules can therefore be reliably and repeatably made in formats of more than three rows with a 250 micron pitch or less without the deformation and problems heretofore experienced.

Testing conducted by the inventors and their associates has confirmed the cooperative features and benefits of the present invention as contrasted with, and contrary to, conventional wisdom and the teaching of the prior art. Specifically, contrary to conventional wisdom, testing has revealed that up to a certain material specific point, reducing the thickness of the forward portion and eliminating the guide grooves had no effect on the ferrule's ability to support the fibers or on the ability to insert the fibers into the holes. In addition, at a thickness of 150 microns or even less (depending upon the particular material used), the ferule's structural integrity, although slightly reduced by an absolute measure, was more than sufficient for the intended purpose. This result was not obvious prior to testing, and was contrary to expectations, conventional engineering judgement and our experiences with those in the art.

Due to the invention, ferrules configured for large arrays of fibers, including specific arrangements such as shown in FIGS. 9A through 9G, having two-dimensional formats larger than the 1×12 and 2×12 arrays of the prior art can be produced using conventional molding techniques. Although the particular configurations and arrangements of the arrays, in terms of specific placement, pitch and number of fibers in the array is unimportant to the invention, some representative example arrangements that can now be readily made include a large format rectangular array of multimode or single mode fibers (FIG. 9A) on less than 250 micron pitch (for example, a 150 micron pitch for conventional 125 micron diameter (core+cladding) single mode and multimode fibers, or a 65 micron or less pitch for single mode fibers with as small as a 7–9 micron diameter (5 micron core+1–2 micron cladding)). In addition, arrangements of single or multimode fibers in a 3 row rectangular array (FIG. 9B), a 6 row rectangular array (FIG. 9C), a 9 row rectangular array (FIG. 9D), a square array (FIG. 9E), a hexagonal array (FIG. 9F) and a circular array (FIG. 9G) can be made on a pitch of 250 microns or less.

Figure 10:
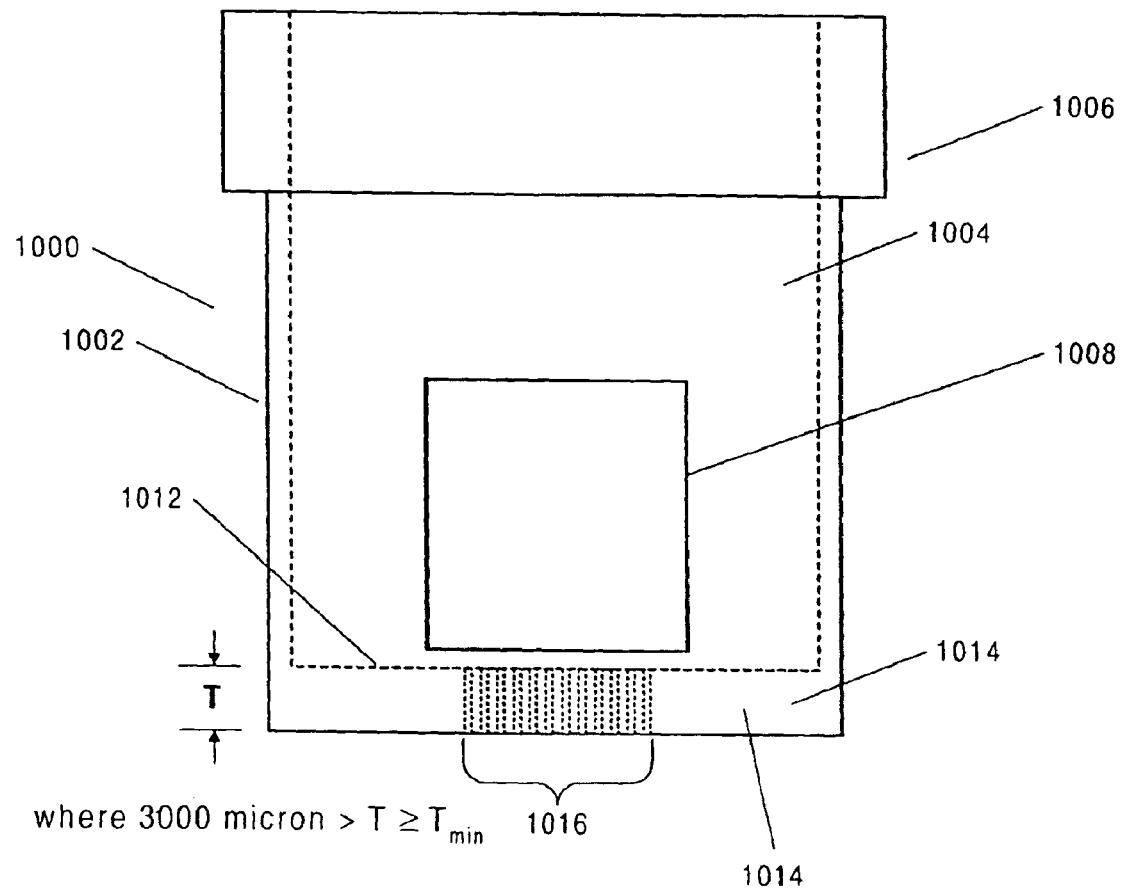
FIG. 10 is a simplified representative example of a top view of a multi-row ferrule according to the present invention.

FIG. 10 is a simplified representative example of a top view of a multi-row ferrule 1000 according to the present invention. The ferrule 1000 is dimensioned to be used in a commercially available connector, such as an ST, LC, MT-RJ, MTP, MPO, MPX or SMC connector to name a few. The ferrule 1000 has a body 1002, a chamber 1004 defined by the body 1002, a shoulder 1006, an (optional) access window 1008, a face surface 1010, an inner surface 1012, a forward portion 1014 defined by the separation between the face surface 1010 and the inner surface 1012, multiple fiber holes 1016 (as shown they are arranged in aligned rows of 12 holes per row), and (optionally) additional features or holes (not shown) that are used for other purposes not relevant to the invention.

In contrast to the prior art however, the thickness of the forward portion "T" is less than 3000 microns but greater than Tmin and, in this example, there are no guide grooves at all.

While the maximum thickness of the forward portion 1014 (including guide structures, if any) will be less than 3000 microns, the particular thickness T that can be used will be within a range that will be material dependent and hence, may vary from material to material. This is because T is less than or equal to the maximum thickness that allows the ferrule to be properly and repeatably formed from the material, at a commodity item volume yield, using the applicable process.

In general, the minimum thickness, Tmin, of the forward portion 1014 may also vary depending upon the particular material used to make the ferrule. However, Tmin can be readily determined empirically by making a ferrule using the desired material of a good thickness T, for example 250 microns, and then (non-destructively) reducing the thickness of the forward portion 1014, for example by cutting, grinding or polishing, in 10, 20 or even 50 micron increments until the thickness can not properly support the fibers or the structural strength of the ferrule 1000 is unacceptably compromised.

It is expected that, in practice, the thickness of the forward portion 1014 will be somewhere between T<3000 microns and Tmin and, most likely, within a range between 1000 microns and either about 150 microns or Tmin.

Figure 11:
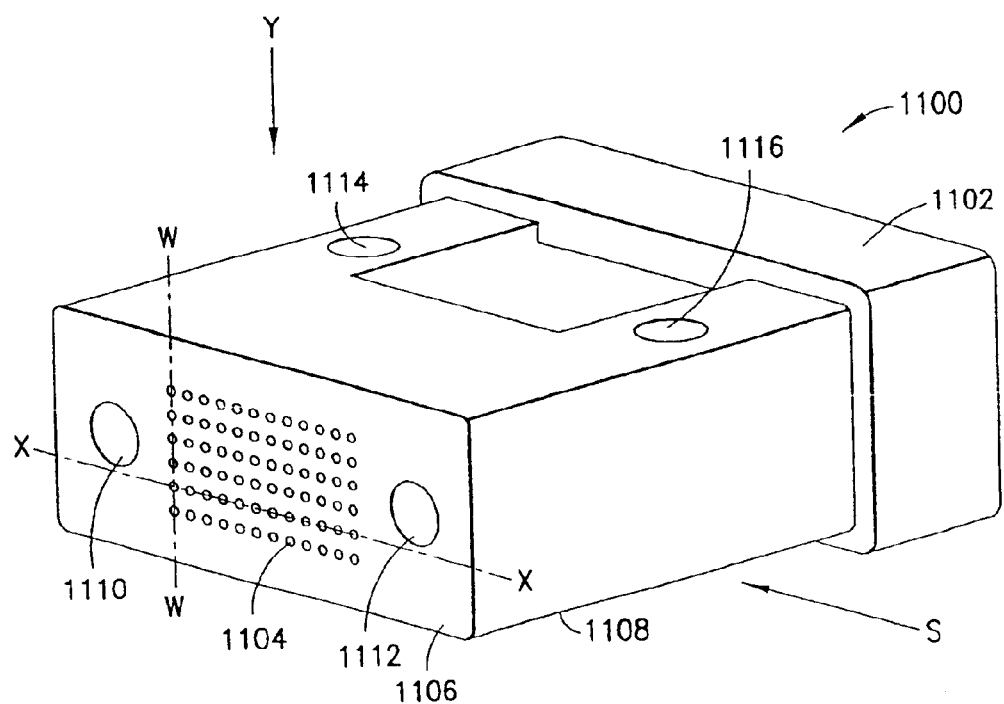
FIG. 11 is an example embodiment of a ferrule incorporating the invention.

FIG. 11 is an example embodiment of a ferrule 1100 incorporating the invention. The ferrule body 1102 has a conventional shape and access window as used in the prior art ferrules—in this case the shape being for use in an MPO style connector—and in this case is made of a polymer, specifically, a cured, glass-filled epoxy. The ferrule also has a 6×12 rectangular array of seventy-two fiber holes 1104 located in the face surface 1106 of the ferrule 1100 and extending through the forward portion 1108 of the ferrule 1100 to the inner surface (not shown). The fiber holes 1104 are dimensioned to be slightly larger than the 125 micron outer diameter of a commonly available multimode optical fiber and are on a 125 micron pitch. Although not evident from this view, the thickness $T_1$ of the forward portion 1108 is less than 3000 microns (for purposes of illustration only, it is 250 microns) and there are no guide grooves at all. As shown, this ferrule 1100 also has the optional features of as guide pin holes 1110, 1112 and placement indentations 1114, 1116 that relate to aspects not pertinent to the invention.

Figure 12:
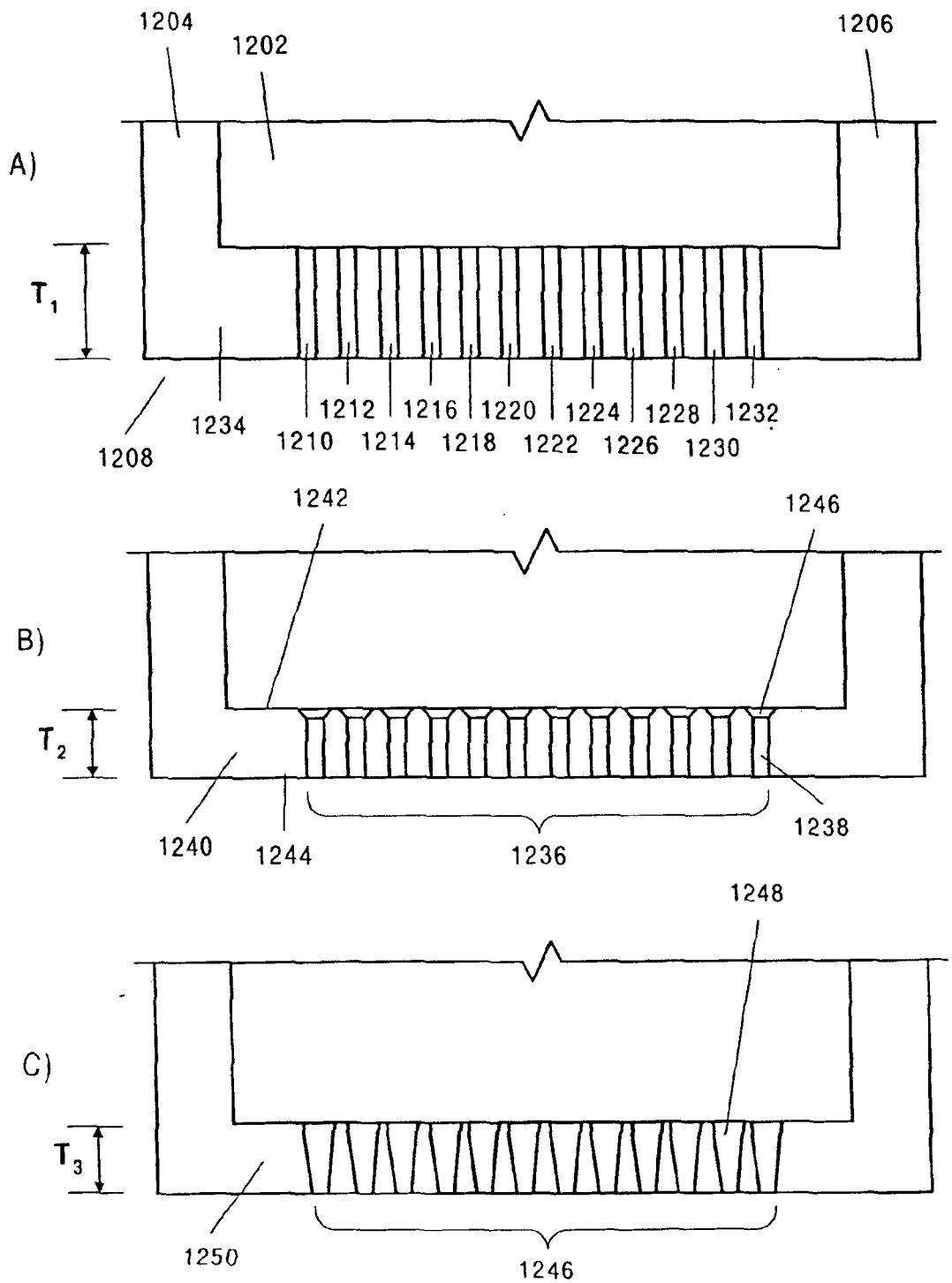
FIGS. 12A through 12C are cutaway portions of alternative examples of various ferrule variants incorporating the invention.
Figure 19:
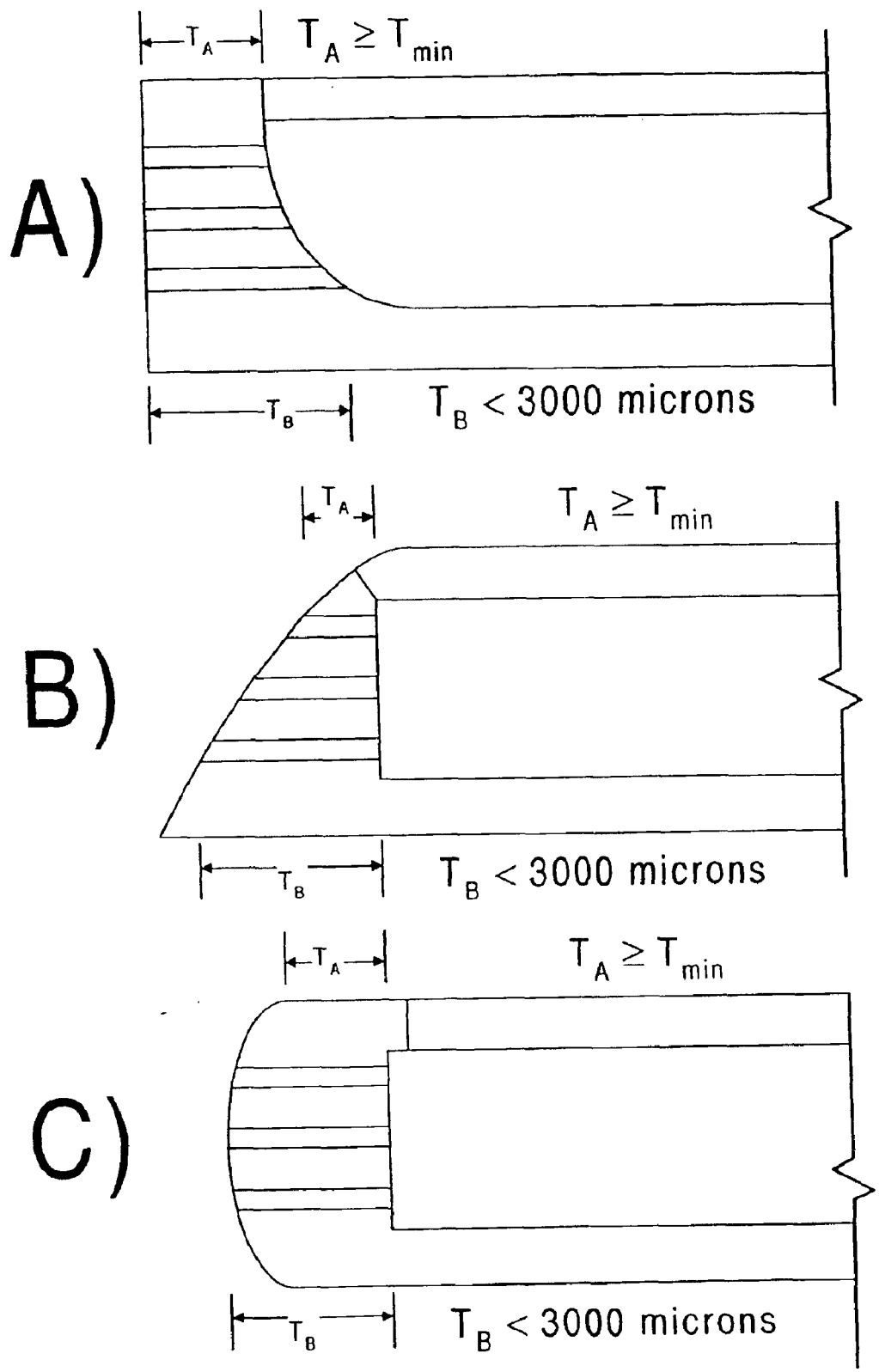
FIGS. 19A through 19C are examples of ferrules having different face and inner surfaces.
Figure 20:
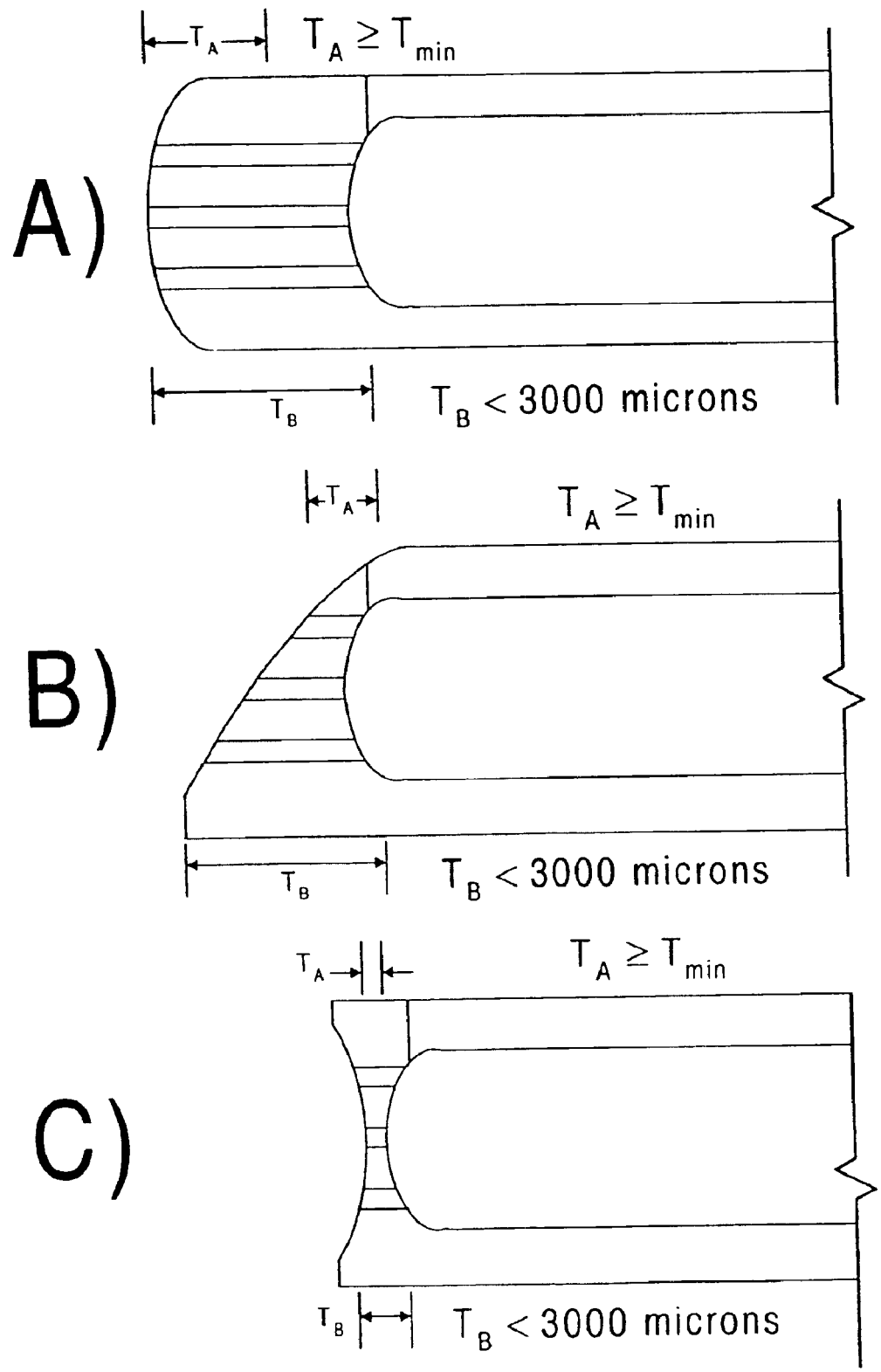
FIGS. 20A though 20C are further examples of ferrules having different face and inner surfaces.

FIGS. 12A through 12C are cutaway portions of alternative examples of various ferrule variants incorporating the invention.

FIG. 12A is a partial cutaway cross section of the ferrule of FIG. 11 viewed along direction Y at a section taken perpendicular to Y through line X—X. In this view, the chamber 1202, two side walls 1204, 1206 of the body 1102 of the ferrule 1100, the row of twelve fiber holes 1210–1232. In this view, the thickness $T_1$ of the forward portion 1108 can be seen and, as noted above for purposes of illustration, is 250 microns. It will be apparent that, in this example embodiment, the fiber holes 1210–1232 are, within acceptable tolerances, cylindrical.

FIG. 12B is a partial cutaway cross section of another alternative variant of a ferrule similar to the ferrule of FIG. 11 except that, in this case, the fiber holes 1236 are, within acceptable tolerances, cylindrical for only a portion 1238 of their extension through the forward portion 1240. Unlike the fiber holes 1210–1232 of FIG. 12A however, the size of each fiber hole at the inner surface 1242 is larger than the size of the same fiber hole at the face surface 1244. This is because, although formal "guide grooves" are unnecessary, the holes can be made to each be partially flared or tapered 1246 to act as a small guide and assist with fiber insertion (i.e. they can be thought of as a minimal guide structure). Nevertheless, even with the inclusion of a type of minimal guide structure, the overall thickness of the forward portion of the ferrule, including such "guide structures", is less than 3000 microns. As shown in FIG. 12B, the thickness $T_2$ of the forward portion 1240 is about 150 microns.

FIG. 12C is a partial cutaway cross section of yet another alternative variant of a ferrule similar to the ferrule of FIG. 11 except that, in this case, the fiber holes 1246 are, within acceptable tolerances, tapered along their entire length 1248 to act as both a fiber hole and small guide. As noted above, despite the inclusion of another type of minimal guide structure, the overall thickness of the forward portion of the ferrule, including the guide structures, is less than 3000 microns. The thickness $T_3$ of the forward portion 1250 in this example is T min.

FIG. 13 is a partial cutaway cross section of another ferrule 1300 variant similar to the one shown in FIG. 11 as viewed along direction S at a section taken perpendicular to S through line W—W. In this view, the face surface 1302, chamber 1304, upper 1306 and lower 1308 walls of the body 1310 of the ferrule 1300, a part of the access window 1312, a column of six fiber holes 1314, and the inner surface 1316 are all visible. In addition, the location of one of the optional guide holes 1318 is identified. As can be seen in this view, and unlike the ferrules of FIGS. 11 and 12, the inner surface 1316 is sloped to form a natural stepping of the rows of holes relative to each other. An advantage of this variant is that, should a particular customer specification require stepped rows to accommodate a particular fiber insertion technique, the specification can be met without sacrificing manufacturability or yields.

In this example variant, the thickness of the forward portion 1320 will vary between a minimum thickness $T_A$ and a maximum thickness $T_B$, but $T_A$ will be greater than or equal to Tmin and $T_B$ will be less than 3000 microns.

In this example embodiment, the fiber holes 1322–1332 are, within acceptable tolerances, cylindrical in cross section for their length (although, at the inner surface the cylinder is truncated.

FIG. 14 is a partial top view of the ferrule portion of FIG. 13 looking through the access window 1312. In FIG. 14 (although not to scale relative to FIG. 14), the stepping of the fiber holes 1322–1332 by virtue of the angling of the inner surface 1316 is apparent.

FIG. 15 is a partial cutaway cross section of another ferrule 1500 variant similar to the one shown in FIG. 13. This variant however, has flared or tapered holes 1502–1512 such as shown in FIG. 12C.

FIG. 16 is a partial top view of the ferrule portion of FIG. 15 looking through the access window 1514. In FIG. 16 (although not to scale relative to FIG. 15), the stepping of the fiber holes 1502–1512 by virtue of the angling of the inner surface 1516 is similarly apparent.

FIG. 17 is a partial cutaway cross section of another ferrule variant similar to the one shown in FIG. 13. This variant however, has partly flared or tapered holes 1704–1714 such as shown in FIG. 12B.

FIG. 18 is a partial top view of the ferrule 1700 portion of FIG. 17 looking through the access window 1702. In FIG. 18 (although not to scale relative to FIG. 17), the stepping of the fiber holes 1704–1714 by virtue of the angling of the inner surface 1716 is similarly apparent.

As a side note, is to be understood that, although throughout the discussions herein, the inner surfaces and face surfaces have been shown as planar for simplicity, either or both could alternatively be curved, for example, as shown in the representative examples of FIGS. 19A, 19B, 19C, 20A, 20B and 20C to suit a particular application or connector without departing from the invention. In addition, it is to be understood that the face surfaces have consistently been illustrated, for simplicity, as being at a right angle to the side walls of the ferrule. However, it should be understood that, prior to fiber insertion, the face surface could also or alternatively be angled. In addition, as part of the manufacturing process, the face surface can be angle polished following fiber insertion. As a result, in some cases after polishing of the face surface, the thickness of the forward portion may be less than Tmin. Thus, it should be understood that the minimum thickness Tmin is based upon the forward portion thickness prior to fiber insertion since, following fiber insertion and affixation, both the fibers and the ferrule body will be adequately supported irrespective of the post affixation thickness of the forward portion.

In a similar vein, while the fiber holes have all been illustrated, for simplicity, as having a circular cross section, it may be desirable in some cases to make the holes such that they substantially have an oval, square, rectangular or other cross sectional shape to suit a particular application or need.

It should also be understood that, while the ferrules have been illustrated and described by implication as being formed as a single piece, typically from a homogeneous material, ferrules according to the present invention can be made by forming the body from at least two (i.e. multiple) pieces which may or may not be of the same material. In these multipiece variants, the manufacture of the ferrule body will necessarily require connecting the pieces together using an appropriate bonding or connection process. For such multiple piece ferrules, it is expected that one of the multiple pieces will include the forward portion.

We have further discovered that, by going counter to convention and reducing the thickness of the forward portion of the ferrule, ferrules for large arrays of optical fibers can be manufactured using other processes and materials that, under the conventional wisdom would not work for reasons similar to those discussed above. Thus, large array ferrules that are compatible with current commercially available connectors used for small numbers of optical fibers, can be made using any of the prior art transfer molding, injection molding, pouring, casting or powder metallurgy-type pressing techniques. This means that such large array ferrules can be made from polymers (including thermoplastics, polyimides, curable resins, thermoset resins, etc.), ceramics and metals.

FIG. 21 is a fiber optic cable assembly 2100 incorporating a ferrule according to the teachings of the invention. The assembly 2100 includes a length of optical cable 2102 made up of a bundle of multiple individual optical fibers, in this case rows of ribbon cables of fibers where each ribbon has at least 6 fibers. A connector 2104, 2106 is located on each end of the cable 2102. As shown, one connector 2104 is a female connector and the other connector 2106 is a male connector. The male connector 2106 includes a large format array ferrule 2108 made according to the invention so that each fiber that is used in the bundle is constrained in an individual fiber hole in the ferrule 2108.

FIG. 22 is an alternative variant of the cable assembly of FIG. 21. In this variant 2200, the connector 2106 that houses the ferrule 2108 is attached to another element 2202, for example, a different type of connector, a set of connectors in a fan-out configuration, a module (e.g. transmitter, receiver, transceiver, repeater, etc.) or some other device that can send, accept or pass light into or out of the fibers 2102.

Figure 23:
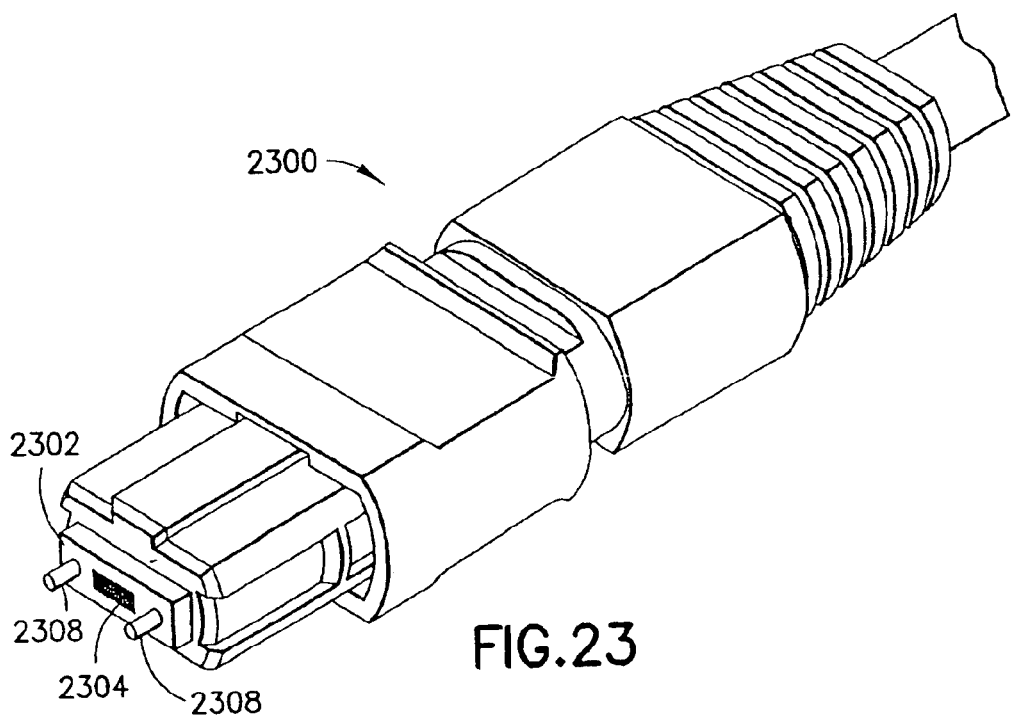
FIG. 23 is an example of a male half of an MTP, MPO, MPX-type connector housing a ferrule made according to the present invention.

FIG. 23 is a representative example of a male half of an MTP, MPO, MPX-type connector 2300 that is housing a ferrule 2302 made according to the present invention. As shown, the ferrule has large format 7×12 rectangular array of fibers 2304 constrained therein on a 125 micron pitch. In the connector 2300 of FIG. 23, the ferrule also includes the optional guide holes through which guide pins 2306, 2308 protrude for alignment purposes.

Figure 24:
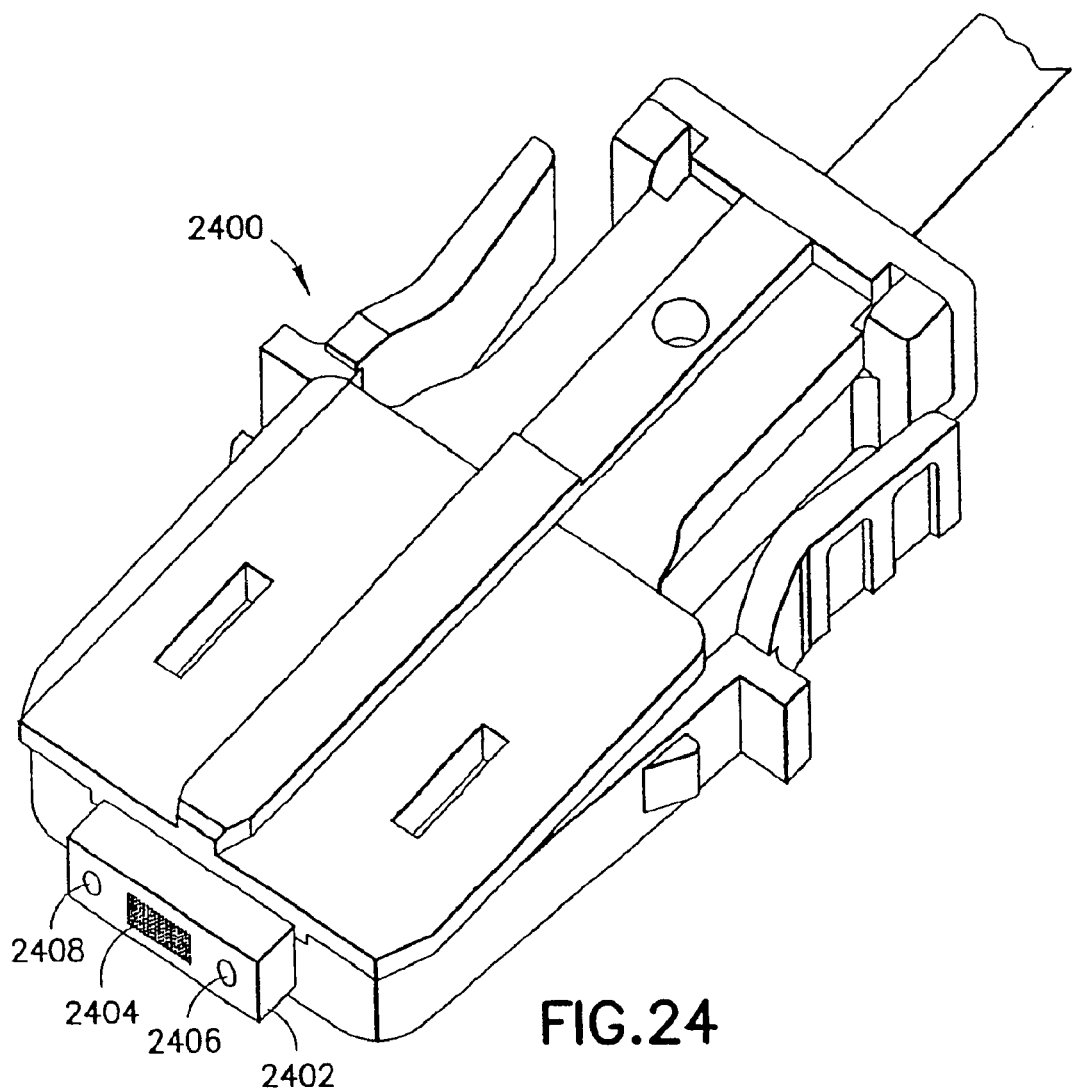
FIG. 24 is a representative example of a male half of an SMC-type connector housing a ferrule made according to the present invention.

FIG. 24 is a representative example of a male half of an SMC-type connector 2400 that is housing a ferrule 2402 made according to the present invention. As shown, the ferrule has large format 8×16 rectangular array of 15 micron diameter (9 micron core) single mode fibers 2404 constrained therein on a 25 micron pitch. In the connector 2400 of FIG. 24, the ferrule also includes the optional guide holes 2406, 2408, however in this particular connector 2400, they are not used.

Thus, while we have shown and described various examples employing the invention, it should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments or other combinations of described portions may be available, is not to be considered a disclaimer of those alternate embodiments. It can be appreciated that many of those undescribed embodiments are within the literal scope of the following claims, and others are equivalent.

What is claimed is:

1. A ferrule comprising:
    a body having a two dimensional array of fiber holes, each of the fiber holes,
        a) passing through the body,
        b) extending over a length,
            i) the length being approximately less than 3000 microns but
            ii) greater than a minimum length sufficient to support optical fibers inserted into the fiber holes, and
        c) having a narrowest dimension about a size equal to and capable of accepting an optical fiber inserted through each hole.

2. The ferrule of claim 1 wherein the length of each fiber hole is between about 1000 microns and the minimum length.

3. The ferrule of claim 1 wherein the length of each fiber hole is between about 500 microns and the minimum length.

4. The ferrule of claim 1 wherein the length of each fiber hole is between about 150 microns and the minimum length.

5. The ferrule of claim 1 wherein the array of fiber holes is arranged in a rectangular array.

6. The ferrule of claim 1 wherein the array of fiber holes comprises multiple rows of at least of 12 holes per row.

7. The ferrule of claim 1 wherein the array of fiber holes comprises rows of at least a multiple of 6 holes per row.

8. The ferrule of claim 1 wherein the fiber holes are substantially cylindrical along their length.

9. The ferrule of claim 1 wherein the fiber holes are tapered along their entire length.

10. The ferrule of claim 1 wherein the fiber holes are tapered along a part of their length.

11. The ferrule of claim 1 wherein the narrowest dimension of a fiber hole is slightly larger than a cross sectional area of a single mode optical fiber.

12. The ferrule of claim 1 wherein the fiber holes are on a pitch of about 250 microns.

13. The ferrule of claim 1 wherein the body has a face and an inner surface, and the fiber holes pass through the body from the face to the inner surface.

14. The ferrule of claim 13 wherein the face and the inner surface are substantially parallel to each other.

15. The ferrule of claim 13 wherein the inner surface is at an angle relative to the face.

16. The of claim 13 wherein at least one of the face or the inner surface are curved.

17. The ferrule of claim 13 wherein the cross-sectional shape of a fiber hole at the face of the ferrule is a non-circular shape.

18. A method of manufacturing a ferrule body comprising:
    fabricating a body having
        a) a front side defining a face of the ferrule,
        b) a rear side defining an inner surface of the ferrule, and
        c) a two dimensional array of fiber holes passing through the body, the fiber holes,
            i) extending over a length from the face to the inner surface, the length being less than 3000 microns but greater than a minimum length sufficient to support optical fibers inserted into the fiber holes, and
            ii) having a narrowest dimension about a size equal to and capable of accepting an optical fiber inserted through each hole.

19. The method of claim 18 wherein the body is fabricated by molding.

20. The method of claim 18 wherein the body is fabricated by machining.

* * * * *